Figure 5:
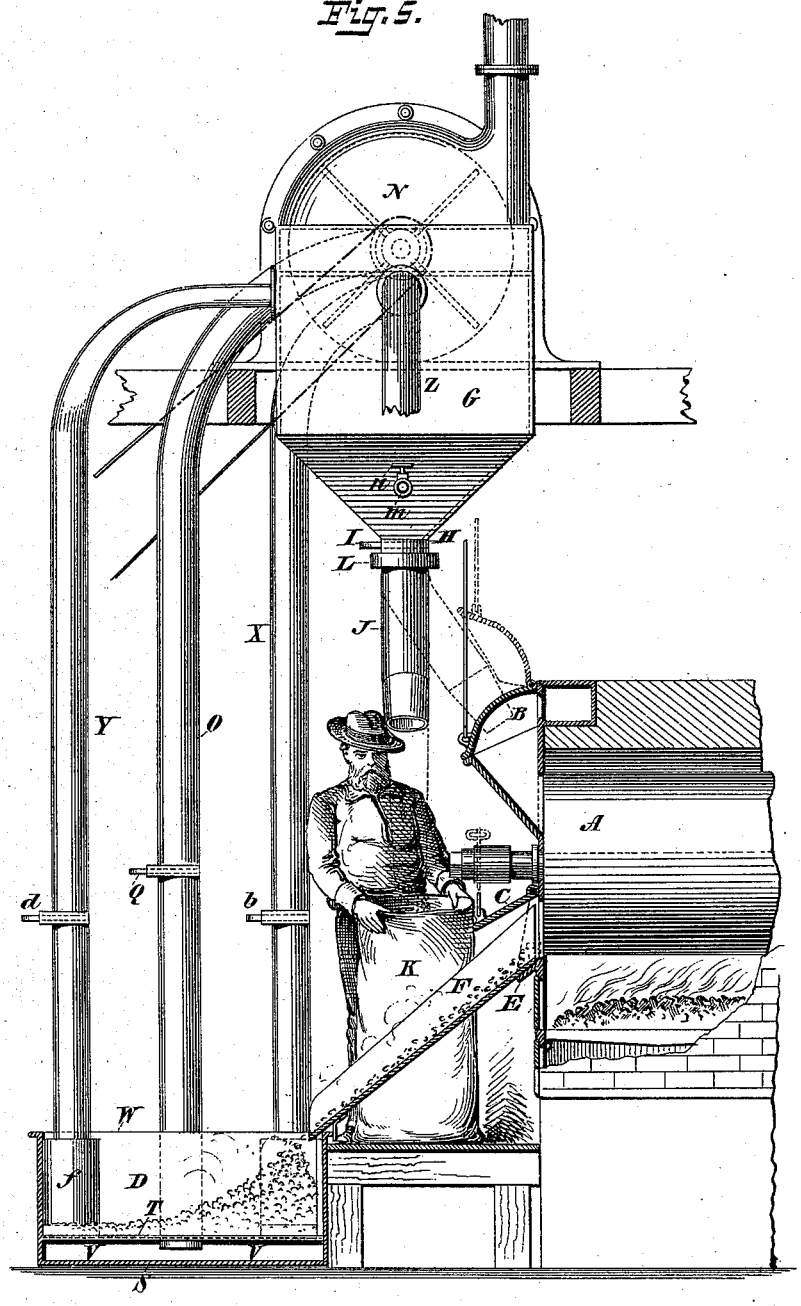

(No Model.) 5 Sheets—Sheet 1.
G. S. HUNGERFORD.
APPARATUS FOR USE IN CONNECTION WITH COFFEE ROASTERS.
No. 412,388. Patented Oct. 8, 1889.
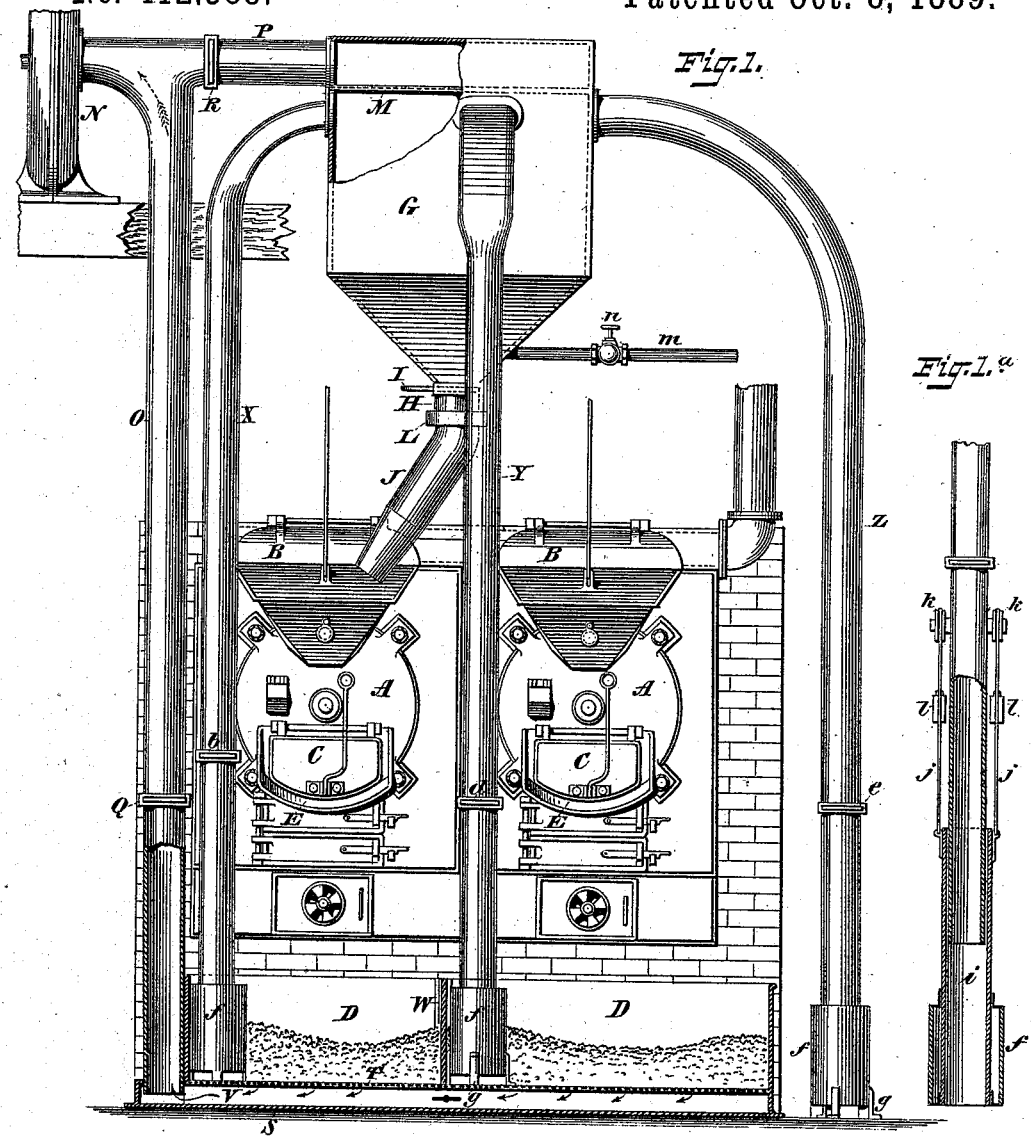
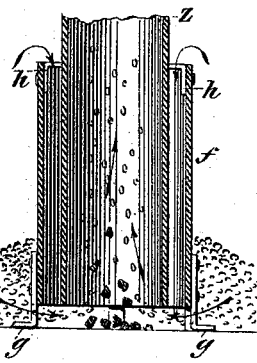
WITNESSES:
Gustave Dieterich
Wm. W. Dashiell
INVENTOR
George S. Hungerford,
BY Chas. C. Gill
ATTORNEY (No Model.) 5 Sheets—Sheet 2.
G. S. HUNGERFORD.
APPARATUS FOR USE IN CONNECTION WITH COFFEE ROASTERS.
No. 412,388. Patented Oct. 8, 1889.
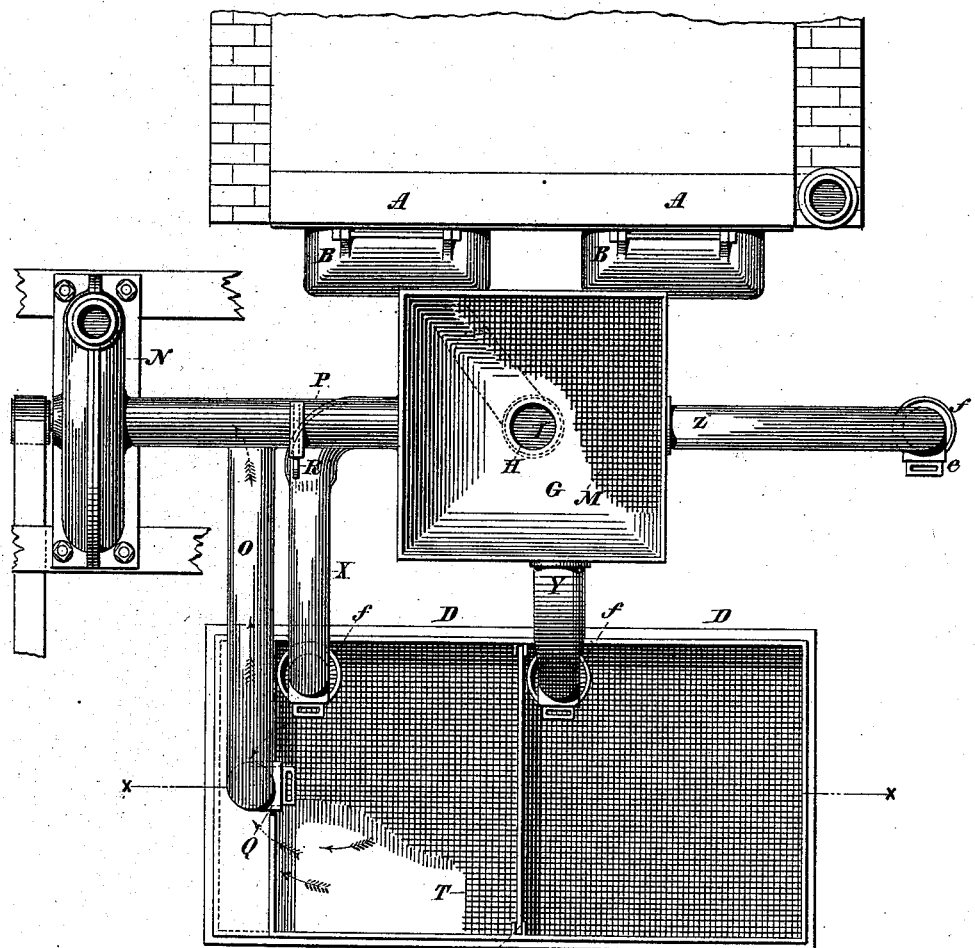
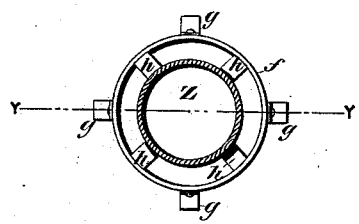
WITNESSES:
Gustave Dieterich
Wm. W. Dashiell
INVENTOR
George S. Hungerford,
BY
Chas. O. Gill
ATTORNEY (No Model.) 5 Sheets—Sheet 3.

G. S. HUNGERFORD.
APPARATUS FOR USE IN CONNECTION WITH COFFEE ROASTERS.

No. 412,388. Patented Oct. 8, 1889.

WITNESSES:
Gustave Dieterich
Wm. W. Dashiell

INVENTOR
George S. Hungerford,
BY Chas. O. Gill
ATTORNEY (No Model.) 5 Sheets—Sheet 4.

G. S. HUNGERFORD.
APPARATUS FOR USE IN CONNECTION WITH COFFEE ROASTERS.

No. 412,388. Patented Oct. 8, 1889.

WITNESSES:
Gustave Dieterich
Wm. W. Dashiell

INVENTOR
George S. Hungerford,
BY Chas. B. Gill
ATTORNEY (No Model.) 5 Sheets—Sheet 5.
G. S. HUNGERFORD.
APPARATUS FOR USE IN CONNECTION WITH COFFEE ROASTERS.
No. 412,388. Patented Oct. 8, 1889.
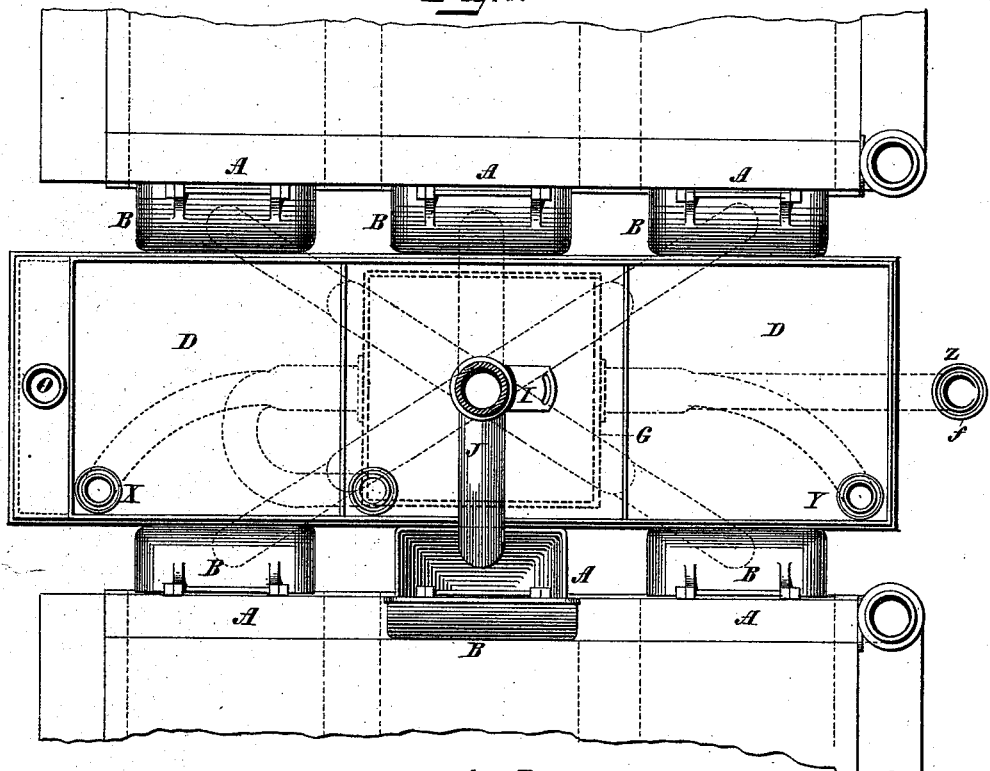
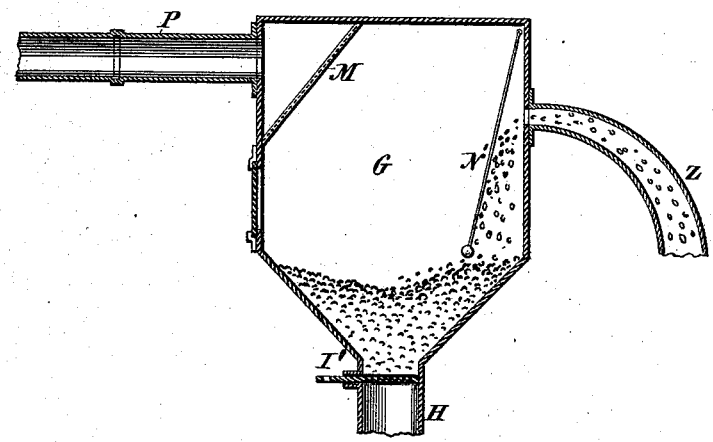
WITNESSES:
Gustave Dieterich
Wm. W. Dashiell
INVENTOR
George S. Hungerford,
BY Chas. B. Gill
ATTORNEY

UNITED STATES PATENT OFFICE.

GEORGE S. HUNGERFORD, OF SYRACUSE, ASSIGNOR TO THE HUNGERFORD COMPANY, OF NEW YORK, N. Y.

APPARATUS FOR USE IN CONNECTION WITH COFFEE-ROASTERS.

SPECIFICATION forming part of Letters Patent No. 412,388, dated October 8, 1889.

Application filed April 23, 1888. Serial No. 271,633. (No model.)

*To all whom it may concern:*

Be it known that I, GEORGE S. HUNGERFORD, a citizen of the United States, and a resident of Syracuse, in the county of Onondaga and State of New York, have invented certain new and useful Improvements in Apparatus for Use in Connection with Coffee-Roasters, of which the following is a specification.

The invention relates to apparatus for use in connection with coffee-roasters; and it consists in the novel arrangement of an elevated hopper connected with an air-exhaust, pipes for elevating either the green or roasted coffee by suction to said hopper, and a discharge-pipe from the hopper for delivering the green coffee to the roasters or the roasted coffee into bags. One exhaust only need be employed for all of the coffee-conveying pipes, and the pipe connecting this exhaust with the hopper should enter the upper part of the latter. The pipes for conveying the coffee upward may be arranged in any manner proving most convenient, according to the conditions of the coffee-roasting room, the location of the roasters and cooling-boxes, and other circumstances. The number of coffee-elevating pipes employed in connection with the elevated hopper will also depend upon the capacity and arrangement of the coffee-roasting room, which circumstances will of course vary and necessitate at times a change in the number and positions of the pipes employed.

In the embodiment of the invention hereinafter described with reference to Figures 1 to 5, inclusive, I present two coffee-roasters with an elevated hopper having one pipe for conveying the green coffee upward and two pipes for elevating the roasted coffee, all of the pipes having gates or valves in order that such of them as it may be desired to use at any one time may alone remain in communication with the suction-blower. The lower end of the pipe for green coffee may be supported a few inches above the floor of the roasting-room on a suitable platform arranged for the purpose and the coffee deposited around it, the valves in the other elevating-pipes being closed, and, the exhaust being set in motion, the green coffee will be brought under the influence of the draft ascending through the pipe and by it carried upward and deposited in the hopper, whence by means of the movable discharge-pipe at the lower end thereof it may be directed into either of the roasters. If desired, one kind or quality of green coffee could be elevated into the hopper and discharged into one roaster, and another kind or quality then conveyed to the hopper and discharged into another roaster, both roasters being thus put into use by aid of the one hopper and one conveying-pipe. After the coffee has been roasted it is by means of a portable chute directed into suitable boxes having a perforated bottom, where it is cooled by the action of the exhaust, creating a downward draft through the same. The roasted coffee having been cooled, it is in condition to be separated from the small gravel and stones usually found in it and then bagged for the market. This operation of stoning and bagging is also accomplished by my invention, in carrying out which I elevate the roasted coffee by suction through pipes passing from the cooling-boxes to the aforesaid elevated hopper, leaving the gravel and stones in the boxes, whence they may be removed by hand and thrown away. The roasted coffee in the elevated hopper may at once be discharged into bags, the outlet-spout from the hopper serving as a means not only of directing green coffee into the roasters, but also to convey the roasted coffee from the hopper into suitable bags ready for marketing.

It should be noted that the one exhaust and the hopper with their connecting-pipes handle both the green and roasted coffee, supply the roasters, cool the coffee and separate it from the gravel and stones and put the cleaned and cooled roasted coffee into condition and position for bagging with a minimum amount of manual labor. The operations of handling the coffee by air are quickly accomplished without danger of breaking the beans of coffee, which always happens when coffee is shoveled into position according to the methods heretofore in use.

In the lower part of the elevated hopper is provided an inlet-pipe, by which the green coffee may be treated with ozone, steam, or other substance, for the purpose of improving its quality or flavor, the excess of aqueous matter introduced through the inlet-pipe being extracted through the medium of the exhaust or allowed to escape through the perforated walls of the discharge-pipe at the bottom of the hopper.

The hopper for receiving and discharging the green and roasted coffee may have a single compartment or two or more compartments, according to the number of roasters in the roasting-room, and in the event of the hopper containing two compartments each of the same will be provided with a discharge pipe or spout at its lower end, and one compartment will preferably be used exclusively for handling the green coffee and feeding it to the roasters, while the other will be employed for elevating the roasted coffee and discharging it into bags.

The discharge spout or pipe at the lower end of the hopper should be capable of revolving, so as to enable the delivery of the coffee at different points, and where a number of roasters are in use—as, for instance, six—the discharge-spout should have a sliding or telescopic section, in order that it may be extended at the proper time to reach the mouth of the various roasters.

It will usually be necessary to provide the hopper with a perforated partition or analogous device between the exhaust-pipe and the upper end of the coffee-conveying pipes, in order to prevent any escape of the coffee through the exhaust; but where the hopper is of sufficient size (to form a dead-air space within it) the partition may be omitted. It may be found expedient, also, to suspend a weighted flexible apron within the hopper in close relation to the mouth of the coffee-conveying pipes, in order that the coffee upon entering will strike it and fall to the bottom of the hopper instead of possibly being drawn with force against the opposite wall of the hopper and broken by the contact therewith. A door is provided in the side of the hopper to enable the attendant to clean the interior of the same when necessary or remove any particles that shall adhere to the perforated partition.

I have described above the cooling of the roasted coffee in the boxes which receive it direct from the roasters; but this step in the process may be accomplished by at once elevating the roasted coffee into the hopper and creating the draft upward through a perforated gate (hereinafter referred to by the reference-letter I') at the upper end of the discharge-pipe.

In addition to the general arrangement of the elements composing the apparatus herein described and claimed, my invention embodies certain details of construction, hereinafter described, by which the operations referred to may be carried into effect with great precision, safety, rapidity, and success.

Figure 6:
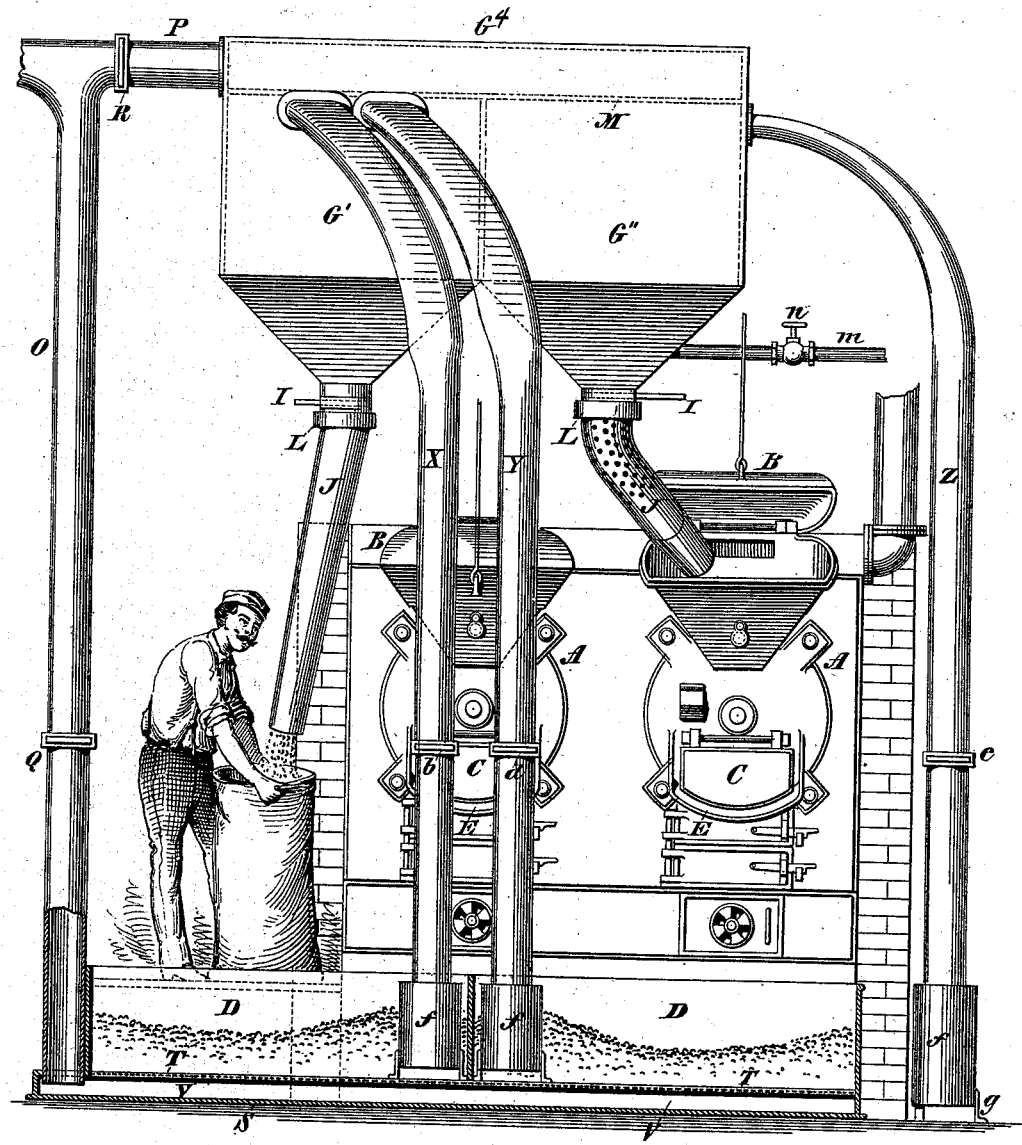

Fig. 1 is a front elevation, partly in section, of an apparatus constructed according to the invention, shown in use with two coffee-roasters. Fig. 1ª is a detached view, partly in section, of a telescopic pipe forming a part of the apparatus. Fig. 2 is an enlarged sectional view of the lower end of one of the conveying-pipes. Fig. 3 is a top view of the apparatus illustrated in Fig. 1. Fig. 4 is a transverse sectional view of the lower end of the pipe shown in Fig. 2. Fig. 5 is a side elevation of the apparatus, partly in section. Fig. 6 is a front view of an apparatus embodying the invention, two hoppers being employed and the cooling-box being in section. Fig. 7 is a top view of an apparatus embodying the invention, shown adapted for use in connection with six roasters, the elevated hopper being indicated by dotted lines and the discharge-spout therefrom by full lines in one position and by dotted lines in the other positions it is required to assume when feeding the different roasters; and Fig. 8 is a vertical section through the elevated hopper, illustrating some features of construction not clearly shown in the other figures of the drawings.

In the drawings, A A denote the roasters, of suitable construction, having at their upper front portion the inlet-doors B B, for the introduction of coffee, and at their lower portion the doors C C, through which the coffee, after being roasted, is discharged into the cooling box or boxes D. The doors B B open upward, as indicated in Figs. 5, 6, and 7, and around the sides and lower portion of the upwardly-acting doors C C are formed the flanges E E, adapted to sustain a portable chute F, as shown in Fig. 5, by which the coffee may be directed into the cooling-box D. At a suitable elevation above the roasters A A is provided a hopper G, which has a covered top and a contracted mouth H at its lower end, said mouth being provided with a gate I, which may be either perforated or solid and can be opened or closed at will. To the mouth H there is secured the discharge-spout J, in order that its lower end may be turned from one roaster to the other or to additional roasters, as hereinafter described.

In Fig. 5, by dotted lines, I illustrate the spout J in position to direct the coffee from the hopper into one of the roasters A, and also in position to direct coffee into a bag K. The discharge-spout J may be secured to the mouth at the lower end of the hopper G by the usual collar L, or by any of the well-known swivel-joints, and in the event of the bag K being too far below the hopper G to be comfortably filled by the spout J alone an extension may be placed upon said spout, as indicated by dotted lines in Fig. 5, which extension will enable the coffee to be directed into the mouth of the bag K without danger of its being spilled or the necessity of the bag being elevated. In instances where, say, six roasters are in use it will be convenient to provide the spout J with a telescopic or sliding section of the usual well-known construction in order that it may be made to accommodate itself to the different distances between the hopper and the different roasters.

In the upper portion of the hopper G is provided a partition M, composed of perforated metal or wire-cloth, as indicated in Figs. 1, 3, 6, and 8, and at a suitable distance from the hopper is secured upon a suitable rafter or other support an exhaust N of the usual construction, said exhaust being connected with the vertical air-pipe O and the transverse pipe P, the latter passing into the hopper G between its closed top and the partition M, and the former extending downward to within a short distance above the solid bottom of the cooling-boxes D D. The pipe O is provided with the sliding gate Q, and the pipe P is provided with the similar gate R, as illustrated. The cooling-boxes D D are of oblong shape, open at the top, and provided above their solid bottoms S with the bottom T, composed of wire-cloth or perforated metal, an air-space being thus formed between the two bottoms, and it is into this space that the lower end of the pipe O passes in order to exhaust the air therefrom and convey it upward, as indicated in Fig. 1. In the present instance I have shown one cooling-box for use in connection with both of the roasters A A, and this necessitates the use of a partition W in the box in order that two kinds of coffee may, if desired, be roasted at one time, one kind in each roaster, and discharged into the cooling-box without becoming mixed. A pipe X passes from the lower portion of one division of the cooling-box to the hopper G, its entrance to the hopper being immediately below the perforated partition M, and from the other division of the cooling-box a similar pipe Y passes upward and opens into the hopper G directly below the perforated partition M, and from a point outside of the cooling-box a third pipe Z passes upward into the hopper G about on a level with the upper ends of the pipes X Y aforesaid. The pipe X is provided with the gate $b$, the pipe Y with the gate $d$, and the pipe Z with the gate $e$, whereby either or all of the said pipes may be closed at will. The lower ends of the pipes X Y Z are encompassed by the sleeves $f$, which are supported on the floor below them by legs $g$, and are secured to the pipes X Y Z by means of the little angle-plates $h$, as shown enlarged in Fig. 2. The purpose of having the sleeves $f$ above the floor is to enable the coffee to be drawn under them and into the pipes X Y Z, and the object of the sleeves is to permit the air to be drawn down along their inner walls on its entrance to said pipes, as indicated by arrows in Fig. 2. If the sleeves $f$ were omitted, all of the air reaching the interior of the pipes X Y Z would of necessity have to pass downward through the body of the coffee; but where the sleeves $f$ are employed they form a space around the lower ends of the pipes, through which the air may gain an entrance unobstructed by coffee.

The pipes X Y Z may be constructed as illustrated in Fig. 1 and will be entirely practicable for most roasting-rooms; but should it be desired to have removable coffee-boxes D it would be desirable to construct these pipes with a telescopic section, as indicated in Fig. 1$^a$, in order that the lower end of the pipe may be elevated to permit the introduction or removal of the box D.

For purposes of explanation the pipe illustrated in Fig. 1$^a$ may be supposed as being the pipe Z adjacent to it. The telescopic section is lettered $i$ and has the sleeve $f$ at its lower end, as in the other elevating-pipes, and in addition thereto is provided with the cords $j\,j$, which pass upward over the pulley $k\,k$, and have at their ends weights $l$ to counterbalance the weight of the section $i$. When it is desired to place a box of coffee below the pipe, the section $i$ may be easily pushed upward, and then, after the box has been inserted, it may be readily drawn downward until its lower end is in position within the box to permit the coffee to enter the same.

In the operation of the apparatus sought to be protected hereby the green coffee may be deposited upon the floor around the lower end of the pipe Z, the gate $e$ opened, and the gates Q, $b$, and $d$ closed, at which time, the exhaust N being in motion, a blast will be created upward through the pipe Z, perforated partition M, and pipe P, whose gate R will be open, the effect being to draw the green coffee upward through the pipe Z into the hopper G. After the green coffee has been deposited into the hopper G the exhaust N may be stopped and the green coffee discharged into either of the roasters A by opening the gate I in the bottom of the hopper and turning the discharge-spout J into the open mouth of the roaster, as indicated by the dotted lines in Fig. 5. After the coffee thus deposited into the roaster has been sufficiently treated the portable chute F will be placed in position and the door C opened, when the coffee will escape down the chute and be directed thereby into the cooling-boxes D. The cooling of the coffee in these boxes may be effected by closing the gate R and opening the gate Q in the pipe O, at which time, the exhaust N being in motion, the air will be drawn downward through the body of the coffee in the cooling-boxes and be discharged upward through the pipe O. After the coffee has been sufficiently cooled the gate Q will be closed and the gates R and $b$ opened, and also the gate $d$ opened, if the roasted coffee is in both compartments of the cooling-box D, the effect of this being to create an upward blast through the pipes X Y, thereby drawing the roasted coffee upward through said pipes X Y and depositing it in the hopper G, the gate in the lower end of the hopper being closed during this part of the operation of the apparatus. The stone and gravel in the roasted coffee, being heavier than the coffee, will not ascend through the pipes X Y, but will remain on the perforated bottom T of the cooling-box, from which it may be removed and discarded.

The coffee when roasted is of less specific gravity than when green, and in elevating it from the cooling-boxes the force of the exhaust is lessened by partially closing the pipe P by means of the gate R, the effect of which is, that the roasted coffee will be carried to the elevated hopper G, while the gravel and stone will remain in the cooling-boxes, the exhaust under the condition specified being insufficient to elevate them.

In lieu of cooling the roasted coffee in the boxes D, this step in the treatment may be accomplished in the hopper G, if desired, and if so the coffee will be immediately conveyed from the box or boxes D to the hopper and a draft created upward through the perforated gate I' in the bottom of the hopper, thus carrying off the heat, the gravel and stone, as before, being left in the box or boxes D.

The next step in the operation will be to dispose of the roasted coffee now in the hopper G, and this may be done according to the desire of the attendant. I, however, illustrate in Fig. 5 one method of disposing of the roasted coffee, which consists in immediately bagging it. During this operation it will probably be convenient to attach to the lower end of the discharge-spout J a section of pipe, as indicated by dotted lines in Fig. 5, in order that the attendant will not be required to hold the bag K to the spout. It will be observed that in the apparatus described, using but one hopper G and one exhaust, I am able to convey the green coffee into the roasters by means of air-suction to discharge it roasted into the cooling-box by means of a portable chute, to then cool the roasted coffee by means of air-suction, then elevate the roasted coffee into a position where it may be conveniently bagged, and remove the stones therefrom, all without manual labor and without incurring the risk of breaking the grains of coffee which occurs when the coffee is handled.

In Fig. 6 the hopper G⁴ is constructed with two compartments lettered G' and G'', respectively, constituting, in reality, two hoppers—the hopper or compartment G' for roasted coffee and the hopper or compartment G'' for green coffee. The compartment G'' is provided with the discharge spout or pipe J and a gate I, and the compartment G' is likewise provided with a gate and spout adapted for use in bagging coffee, as shown. The pipes X Y lead into the compartment G', and the pipe Z into the compartment G''. A hopper with a single compartment would be sufficient for use in connection with two or three roasters; but where a larger number of roasters are in use one compartment would probably not be sufficient to handle all of the green and roasted coffee, and in such cases the hopper having two compartments should be made use of—one for handling the green coffee and feeding the roasters and the other for handling the roasted coffee and bagging it.

In the lower part of the hopper G, I provide a pipe m, having a valve n, for the purpose of introducing steam or any other gaseous substance for the purpose of treating the coffee chemically or otherwise to improve its flavor. This will preferably be done while the green coffee is in the hopper G, prior to its being discharged into the roasters A, any excess of aqueous matter being drawn off through the exhaust or permitted to escape through the perforations in the discharge-spout J. (Shown in Fig. 6.)

The form of the partition M will vary according to the capacity of the hopper, and in cases where the hopper is sufficiently large to form a dead-air space there will be no danger of the coffee escaping through the exhaust, and the partition may then be omitted. Within the hopper, as shown in Fig. 8, there will preferably be suspended a weighted flexible apron N', to prevent the coffee being drawn with force against the opposite side of the hopper and possibly broken.

An important feature as applied to the elevating-pipes is in flattening the upper and lower sides of the pipes or reducing the vertical diameter of the same at their upper portions, or where they turn from a vertical line, as shown in the various figures of the drawings. I have discovered that where a pipe of uniform diameter is employed the tendency of the coffee is to gravitate to and rest upon that portion of the pipe immediately above its bend, or where it turns from a vertical line, the air at this time passing over the surface of the body of coffee thus accumulated without drawing it into the hopper G. Where, however, the upper and lower sides of the curved portion of the elevating-pipes are flattened or reduced in vertical diameter, as indicated in the pipes Z X Y, the air-area will be reduced in vertical diameter and extended laterally, and the blast will be caused to move with equal force along the upper and lower sides of the pipes and carry the coffee into the hopper G. I recommend in all instances the flattening of the upper ends of the pipes where they leave a vertical line; but it is, of course, possible to obtain a more or less satisfactory result without flattening the pipes where they take a very gradual curve from a vertical line.

I do not limit my invention to use in connection with the handling and treatment of coffee, since there are other species of beans, as well as various kinds of grains, spices, and nuts, that could be handled with advantage by the apparatus sought to be protected herein. While, therefore, I have specifically described the handling of coffee, it must be understood that this has been done for the purpose of clearly explaining the invention, both as to its construction and operation.

What I claim as my invention, and desire to secure by Letters Patent, is—

1. The apparatus hereinbefore described for use in connection with coffee-roasters, said apparatus consisting of the elevated hopper having a discharge-pipe at its lower end, combined with an exhaust in communication with the hopper, an elevating-pipe for green coffee leading into the hopper, a box having a perforated bottom to receive the roasted coffee from the roaster, a pipe connected with the exhaust for creating a cooling draft through the coffee, and an elevating-pipe for returning the roasted coffee to the hopper, leaving the gravel and stones in the box, substantially as set forth.

2. In apparatus for handling coffee by air-suction, an exhaust, combined with the hopper and a conveying-pipe leading from the hopper to the coffee, the lower end of this pipe being provided with a sleeve $f$, having legs $g$ and lugs $h$, and forming an air-space between it and said pipe, substantially as set forth.

3. The elevated hopper having the discharge-pipe at its lower end, combined with an exhaust in communication with the hopper, the cooling-box for holding the coffee and having a perforated bottom, a draft-pipe extending from the exhaust to a point below said perforated bottom, and an elevating-pipe extending from said box to the hopper for conveying the coffee after being cooled to the hopper, leaving the gravel and stones in the box, substantially as set forth.

4. In apparatus for handling coffee by air-suction, the exhaust, combined with the hopper and a conveying-pipe leading from the hopper to the coffee, that portion of the pipe turning from a vertical line being reduced in diameter in one direction, substantially as set forth.

5. In apparatus for handling coffee by air-suction, the elevated hopper having a discharge-pipe at its lower end and an exhaust-pipe, combined with an elevating-pipe leading into said hopper and a weighted flexible apron suspended within the hopper over the mouth of said pipe, substantially as set forth.

6. The hopper having a discharge-pipe at its lower end and the perforated gate $I'$, covering said discharge, combined with an exhaust connected with the hopper and a conveying-pipe leading from the base of the apparatus to said hopper, substantially as set forth.

7. The apparatus for use in connection with coffee-roasters, said apparatus consisting of a hopper having the discharge-pipe at its lower end, combined with a receptacle to receive the roasted coffee from the roaster, an elevating-pipe for conveying the roasted coffee to the hopper, and an air-exhaust in communication with said hopper and with said receptacle, the exhaust-connection being separated from the roasted coffee in the receptacle while the coffee is being cooled by a perforated partition, substantially as set forth.

Signed at New York, in the county of New York and State of New York, this 13th day of April, A. D. 1888.

GEORGE S. HUNGERFORD.

Witnesses:
 CHAS. C. GILL,
 HERMAN GUSTOW.